United States Patent [19]
Elser et al.

[11] Patent Number: 5,138,896
[45] Date of Patent: Aug. 18, 1992

[54] STEERING GEAR, ESPECIALLY FOR MOTOR VEHICLES

[75] Inventors: Dieter Elser, Essingen; Rudolf Schurr, Aalen, both of Fed. Rep. of Germany

[73] Assignee: Zahnradfabrik Friedrichshafen, AG., Friedrichshafen, Fed. Rep. of Germany

[21] Appl. No.: 681,516
[22] PCT Filed: Dec. 13, 1989
[86] PCT No.: PCT/EP89/01531
§ 371 Date: Apr. 26, 1991
§ 102(e) Date: Apr. 26, 1991
[87] PCT Pub. No.: WO90/06879
PCT Pub. Date: Jun. 28, 1990

[30] Foreign Application Priority Data

Dec. 15, 1988 [DE] Fed. Rep. of Germany ....... 3842187

[51] Int. Cl.$^5$ .................... B62D 3/08; F16H 57/12
[52] U.S. Cl. ........................ 74/499; 74/422; 74/440
[58] Field of Search .......... 74/409, 440, 498, 499, 74/500, 422

[56] References Cited

FOREIGN PATENT DOCUMENTS

| | | |
|---|---|---|
| 2735958 | 2/1979 | Fed. Rep. of Germany . |
| 724691 | 1/1932 | France . |
| 2076982 | 10/1971 | France . |
| 2641351 | 7/1990 | France .................. 74/440 |
| 59-80563 | 5/1984 | Japan .................. 74/440 |

Primary Examiner—Allan D. Herrmann
Attorney, Agent, or Firm—Albert M. Zalkind

[57] ABSTRACT

A steering gear, especially for motor vehicles, has a steering worm sector shaft (10) including a toothed quadrant and a steering nut (4) displaceable axially by a steering shaft and engaging with the toothed quadrant with a steering rack section (7). To eliminate the toothing play occurring between the toothed quadrant and the steering rack section (7), a spring pressure element (14) is provided that is located outside of the surface plane that includes the axis of the steering shaft and is perpendicular to the toothing surface plane of the steering rack section (7), and that exerts a twisting force on the steering nut (4) in the straight-ahead-travel position of the steering gear. The spring pressure element (14) includes two spring washers (15, 16) located concentrically with each other on the steering worm sector shaft (10). The two spring washers (15, 16) are connected with each other by a connecting arm (17). The outer spring washer (15) bears an extension (18) directed radially outward that has the shape of the central tooth of the toothed quadrant and is supported by the steering rack section (7) in the straight-ahead-travel position of the steering gear. The side of the inner spring washer (16) facing the steering rack section (7) is supported by the steering worm sector shaft (10).

10 Claims, 3 Drawing Sheets

STEERING GEAR, ESPECIALLY FOR MOTOR VEHICLES

BACKGROUND OF THE INVENTION

The invention relates to a steering gear, especially for motor vehicles. Such a steering gear has a steering worm sector shaft including a toothed quadrant and a steering nut engaging with the toothed quadrant with a steering rack section and displaceable axially by a steering shaft. To eliminate the play between the toothed quadrant and the steering rack section that occurs after rather lengthy operation, a spring pressure element is provided. It is located outside the surface plane containing the steering shaft axis and perpendicular to the toothing surface plane of the steering rack section and exerts a twisting force on the steering nut when the steering gear is in a straight-ahead-travel position.

BRIEF DESCRIPTION OF THE PRIOR ART

Such a steering gear is known from DE-PS 27 35 958. In that known steering gear, the spring pressure element consists of several individual parts—specifically, a pressure pin, a spring and a nut. In fact, adequate automatic compensation for tooth play is possible with the known apparatus. However, since the spring pressure element consists of several individual parts, the expense of production and assembly is relatively high.

The object of the invention is to make the device for automatic tooth play compensation in the form of a compact spring pressure element which is easy to assemble and economical, and to install it in place in the known steering gear.

SUMMARY OF THE INVENTION

A primary object of the invention relates to making the spring pressure element as a one-piece part and locating it between the steering worm sector shaft and the steering rack section. It is especially advantageous if the spring pressure element consists of two spring washers, located concentrically with each other on the steering worm sector shaft, that are connected with each other. The outer spring washer is supported by the steering rack section with prestressing, with an extension directed radially outward in straight-ahead travel, and the side of the inner spring washer facing the steering rack section is supported by the steering worm sector shaft. Since the spring pressure element is a one-piece part, it can easily be produced as a stamped metal part, a gas-cut part, a laser-beam-cut, or as a waste-wax casting. The spring pressure element can very easily be slid onto the end of the toothed quadrant of the steering worm sector shaft instead of a check plate on the steering worm sector shaft.

If the extension of the outer spring washer is fitted to the toothing of the toothed quadrant, and especially if the extension has the shape of the center tooth of the toothed quadrant, a "shifting pressure point" is obtained together with the steering rack section of the steering nut. As a result, the reverse travel characteristics of the steering gear are retained, and only very small additional frictional forces arise in the neutral position in spite of the spring tension.

To obtain adequate strength of the spring pressure element against fatigue, the two spring washers are made with a tension-optimized cross-sectional pattern. That means that the spring washers are made correspondingly wider in the areas that are under greater stress.

Since automatic tooth play compensation is necessary only in a limited area on both sides of the straight-ahead-travel position in which the greatest wear on the toothing occurs, the spring pressure element is designed only for that area. That means that at least the outermost of the two spring washers must be held rotation-proof on the steering worm sector shaft.

BRIEF DESCRIPTION OF THE DRAWING

In the following specification, the invention is explained in greater detail with the help of an example that is shown in the drawings, in which.

DETAILED DESCRIPTION

Figure 1:
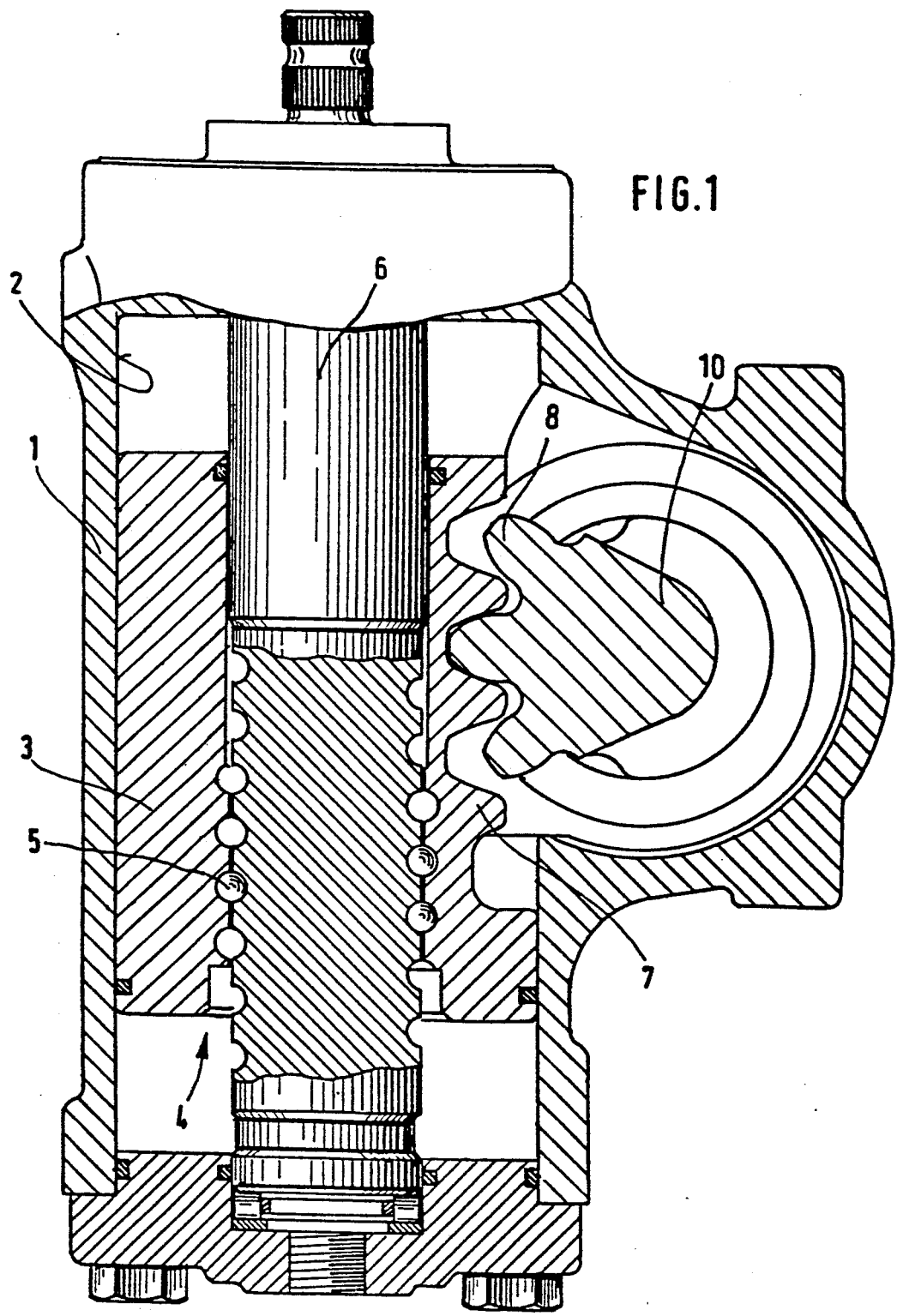
FIG. 1 shows a longitudinal section through the steering gear of the invention.
Figure 2:
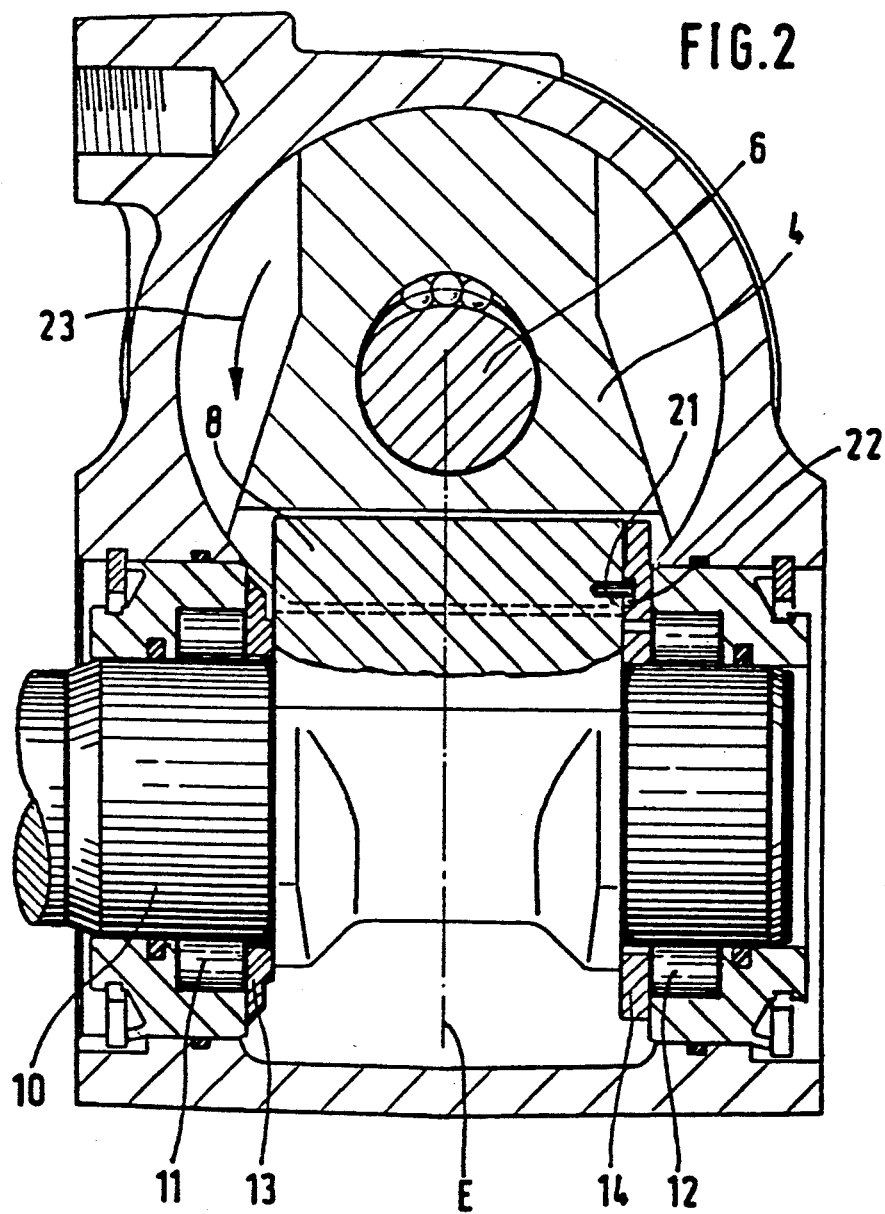
FIG. 2 shows a cross section through the steering gear of FIG. 1.
Figure 3:
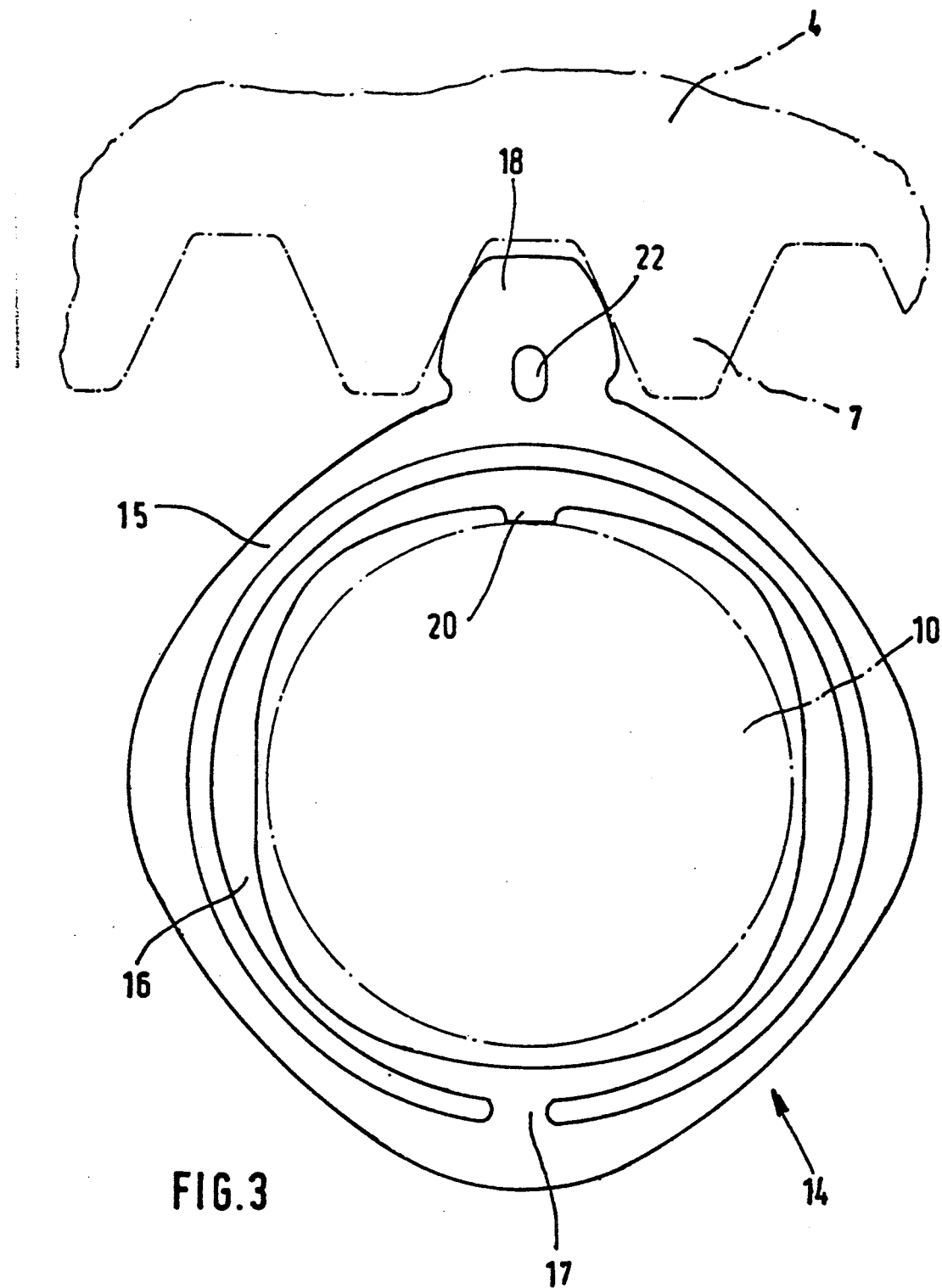
FIG. 3 shows an enlarged plan view of the spring pressure element.

A conventional steering gear contains, in a steering gear housing 1, a servo cylinder 2 in which a servo piston 3 is located for axial displacement. The servo piston 3 includes a steering nut 4 that is connected, for purposes of propulsion, with a steering shaft 6 by a ball-circulation device 5. The steering shaft 6 is capable of rotating in the steering gear housing 1, but is fixed axially. The servo piston 3 and/or the steering nut 4 is connected for purposes of propulsion with a toothed segment 8 of a steering worm sector shaft 10 by a steering rack section 7. The use of the invention is not limited to steering gears with auxiliary power assistance. Instead, its use is possible with all steering gears that have a toothed quadrant and a steering rack section that belongs to it.

The steering worm sector shaft 10 is fixed rotatably in the steering gear housing 1 by bearings 11 and 12. Support in the axial direction to one side takes place by means of a check plate 13. The check plate for supporting the steering worm sector shaft 10 in the other direction is replaced by a spring pressure element 14. The spring pressure element 14 butts against a front surface of the toothed quadrant 8 and consequently is outside of the surface plane E containing the axis of the steering shaft 6 and perpendicular to the toothing surface plane of the steering rack section 7.

The spring pressure element 14 includes two spring washers 15 and 16 located concentrically with each other on the steering worm sector shaft 10. The sides of the two spring washers 15 and 16 facing away from the steering rack section 7 are connected with each other by a connecting arm 17. The outer spring washer 15 has an extension 18 that is directed radially outward, is accommodated in its shape to the central tooth of the toothed quadrant 8 and is supported, with prestressing, by the steering rack section 7 in the straight-ahead-travel position of the steering gear. The side of the inner spring washer 10 facing the steering rack section 7 is supported by a cam 20 on the steering worm sector shaft 10 that is directed radially inward.

The two spring washers 15 and 16 have a tension-optimized cross-sectional pattern. This favorable cross-sectional pattern consists of having the spring washers 15 and 16 wider in their areas with the greatest bending stress in the radial direction than in the other areas.

The wear that occurs on the steering rack section 7 and the toothed quadrant 8 when the steering gear is operated rather long is greatest in the central area—that is, in straight-ahead operation of the steering gear. Therefore the automatic tooth play compensation can be limited to that central area. To keep the toothed-shaped extension 18 in its exact location, the spring pressure element 14 on the steering work shaft 10 must be protected against rotation. For that purpose, a pin 21 is inserted in the face of the toothed quadrant 8 that engages in a groove 22 in the outer spring washer 15. To permit the travel stroke of the outer spring washer 15, the groove 22 is made longitudinal.

A twisting force in the direction of the arrow 23 is exerted by the spring pressure element 14 on the steering rack section 7 of the steering nut 4. As a result, the steering nut 4 is tilted when the toothing of the steering rack section 7 and/or the toothed quadrant 8 becomes worn, so that the toothing is rendered free of play automatically.

We claim:

1. In a motor vehicle steering gear including a steering worm sector shaft (10) having a toothed quadrant (8), and a steering nut (4) engaging a steering rack section (7) having a toothed surface, the nut being axially displaced by a steering shaft (6), and a spring pressure element (14) arranged beyond a plane (E) perpendicular to the plane containing the tooth surface of the steering rack section and containing the axis of the steering shaft for exerting a twisting force on the steering nut (4) in the straight-ahead travel position of the steering gear in order to eliminate play between the teeth of the toothed quadrant (8) and the steering rack section, the improvement wherein the spring pressure element (14) comprises at least one unitary plate arranged between the steering worm sector shaft (10) and the steering rack section, said element being pre-stressed on one side by the steering rack section in the straight-ahead-travel position via an outward radial extension (18) and on the other side by the steering worm sector shaft.

2. A steering gear as defined in claim 1, wherein said spring pressure element includes two concentrically arranged spring washers (15, 16) connected together and located on the steering worm sector shaft, said extension extending from an outer one of said washers and a side of an inner one of said washers facing the steering rack section being supported by the steering worm sector shaft.

3. A steering gear as defined in claim 2, wherein the sides of the two spring washers turned away from the steering rack section (7) are connected with each other by a connecting arm (17).

4. A steering gear as defined in claim 2, wherein said extension has a shape corresponding with the toothing of the toothed quadrant (8).

5. A steering gear as defined in claim 4, wherein said extension (18) has a shape corresponding to the central tooth of the toothed quadrant (8).

6. A steering gear as defined in claim 2, wherein said inner spring washer (16) has a cam (20) directed radially inward for supporting by the steering worm sector shaft (10).

7. A steering gear as defined in claim 2, wherein said spring washers (15, 16) have a tension-optimizing cross-sectional pattern.

8. A steering gear as defined in claim 1, wherein the spring pressure element (14) is prevented from rotation with respect to the steering worm sector shaft (10).

9. A steering gear as defined in claim 8, wherein the spring pressure element (14) is prevented from rotation by a pin (21) fastened in the toothed quadrant (8) through a groove (22) located in the outer spring washer (15).

10. A steering gear as defined in claim 2, wherein the spring pressure element (14) is prevented from rotation with respect to the steering worm sector shaft (10).

* * * * *